(12) United States Patent  (10) Patent No.: US 7,961,424 B2
Cherubini et al.  (45) Date of Patent: Jun. 14, 2011

(54) MULTILEVEL PULSE POSITION MODULATION FOR EFFICIENT ENCODING OF INFORMATION INTO SERVO PATTERNS

(75) Inventors: Giovanni Cherubini, Rueschlikon (CH); Jens Jelitto, Rueschlikon (CH); Robert A. Hutchins, Tucson, AZ (US); Mark A. Lantz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 12/609,053

(22) Filed: Oct. 30, 2009

(65) Prior Publication Data

US 2011/0102927 A1    May 5, 2011

(51) Int. Cl.
*G11B 5/55* (2006.01)
(52) U.S. Cl. ................................... 360/78.02
(58) Field of Classification Search ............... 360/78.02, 360/77.08, 77.12, 75, 48, 49, 29
See application file for complete search history.

(56) References Cited

U.S. PATENT DOCUMENTS

| | | | |
|---|---|---|---|
| 4,766,507 A | | 8/1988 | Kashida et al. |
| 4,987,355 A | * | 1/1991 | Leaper et al. ............... 318/561 |
| 5,930,065 A | | 7/1999 | Albrecht et al. |
| 6,049,438 A | * | 4/2000 | Serrano et al. ............... 360/49 |
| 6,754,032 B1 | * | 6/2004 | Szita et al. ............... 360/77.08 |
| 6,791,781 B2 | | 9/2004 | Bui et al. |
| 7,365,929 B2 | * | 4/2008 | Cherubini et al. ............ 360/73.12 |
| 7,480,114 B2 | * | 1/2009 | Cherubini et al. ............ 360/73.12 |
| 7,742,254 B2 | * | 6/2010 | Cherubini et al. ............ 360/77.12 |
| 7,764,460 B2 | * | 7/2010 | Bates et al. ............... 360/77.12 |
| 7,787,204 B2 | * | 8/2010 | Cherubini et al. ............ 360/48 |
| 2003/0030931 A1 | | 2/2003 | Maple et al. |
| 2006/0085718 A1 | | 4/2006 | Jaquette et al. |
| 2007/0044007 A1 | | 2/2007 | Cideciyan et al. |
| 2011/0007413 A1 | * | 1/2011 | Cherubini et al. ............ 360/31 |

OTHER PUBLICATIONS

G.A. Jaquette, "LTO: a better format for mid-range tape," IBM Journal of Research and Development, Jul. 2003, p. 429-444.
Paul R Hoffman et al., "Position Detemination of an Acoustic Burst Along a Sagnac Interferometer," Journal of Lightwave Technology, V. 22 # 2, p. 494-498.
R.C. Barret et al., "Timing-Based Track-Following Servo for Linear Tape Systems," IEEE Transaction on Magnetics, Jul. 1998, p. 1872-1878.

* cited by examiner

*Primary Examiner* — Fred Tzeng
(74) *Attorney, Agent, or Firm* — Cantor Colburn LLP; Stephen Kaufman

(57) ABSTRACT

A storage medium on which servo patterns are encoded to provide lateral and longitudinal position (LPOS) information is provided. Each of the servo patterns includes a servo frame, including first through fourth bursts, which are each independently modulated with multi-level pulse position modulation (PPM) to encode at least one independent bit per burst.

20 Claims, 4 Drawing Sheets

MULTILEVEL PULSE POSITION MODULATION FOR EFFICIENT ENCODING OF INFORMATION INTO SERVO PATTERNS

BACKGROUND

Aspects of the present invention are directed to multilevel pulse position modulation for efficient encoding of information into servo patterns.

Timing-based servo (TBS) is a technology developed for linear tape drives. In TBS systems, recorded servo patterns consist of transitions or bursts with two different azimuthal slopes, and a head lateral (y)-position is derived from the relative timing of pulses generated by a servo reader reading the pattern.

TBS patterns also allow the encoding of additional longitudinal position (LPOS) information without affecting the generation of the transversal position error signal (PES). This is obtained by pulse-position modulation (PPM) of dibits corresponding to the second and fourth stripes in certain bursts (e.g., bursts A and B of FIG. 1). Currently, systems only encode one bit of information per servo frame using binary PPM, which uses two position shift levels. The modulation depth for binary PPM in LTO is 0.25 μm.

Optimum detection of the servo patterns is achieved by a synchronous servo channel employing a matched-filter interpolator/correlator, which ensures that optimum filtering of the servo reader signal is performed not only at constant tape velocity, but also during tape acceleration and deceleration. A synchronous servo channel thus guarantees the optimum processing of a servo signal for the generation of y-estimates, velocity estimates, and LPOS information.

Optimization of the pattern geometry is of high importance in order to achieve the maximum overall system performance, including the minimization of the standard deviation of PES, the maximization of the parameter update rate to increase the control system bandwidth, and the optimization of the rate of information embedded in the modulated dibits. The servo pattern in LTO technology is mainly designed such that it enables a reliable estimation of the head y-position and the tape velocity. Furthermore, the operating point for the servo channel has to be chosen such that the signal-to-noise ratio (SNR) of the servo readback signals allows the y-position and velocity parameter estimation with sufficient accuracy for proper track-following operation. This typically requires a servo channel SNR of 20 dB or better. On the other hand, reliable detection of LPOS symbols using binary PPM requires much lower SNR.

SUMMARY

In accordance with an aspect of the invention, a storage medium on which servo patterns are encoded to provide lateral and longitudinal position (LPOS) information is provided. Each of the servo patterns includes a servo frame, including first through fourth bursts, which are each independently modulated with multi-level pulse position modulation (PPM) to encode at least one independent bit per burst.

In accordance with another aspect of the invention, a method of controlling information with respect to a storage medium is provided and includes encoding servo patterns on the storage medium to provide lateral and longitudinal position information, each of the servo patterns comprising a servo frame, including first through fourth bursts, which are each independently modulated with multi-level pulse position modulation (PPM) to encode at least one independent bit per burst.

In accordance with another aspect of the invention, a system is provided and includes a storage medium on which servo patterns are encoded to provide lateral and longitudinal position information, each of the servo patterns comprising a servo frame, including first through fourth bursts, which are each independently modulated with multi-level pulse position modulation (PPM) to encode at least one independent bit per burst and a detector to read a servo waveform from the servo patterns of the storage medium and to detect the encoded bits from the servo waveform.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

According to aspects of the present invention, multi-level pulse position modulation (PPM) in timing based servo (TBS) systems allows for the encoding of more than one bit per servo burst without a need for changing basic servo pattern layouts such that new or existing servo write heads and electronics can continue to be used, if necessary, and with or without a change in parameter estimation procedures.

Figure 1:
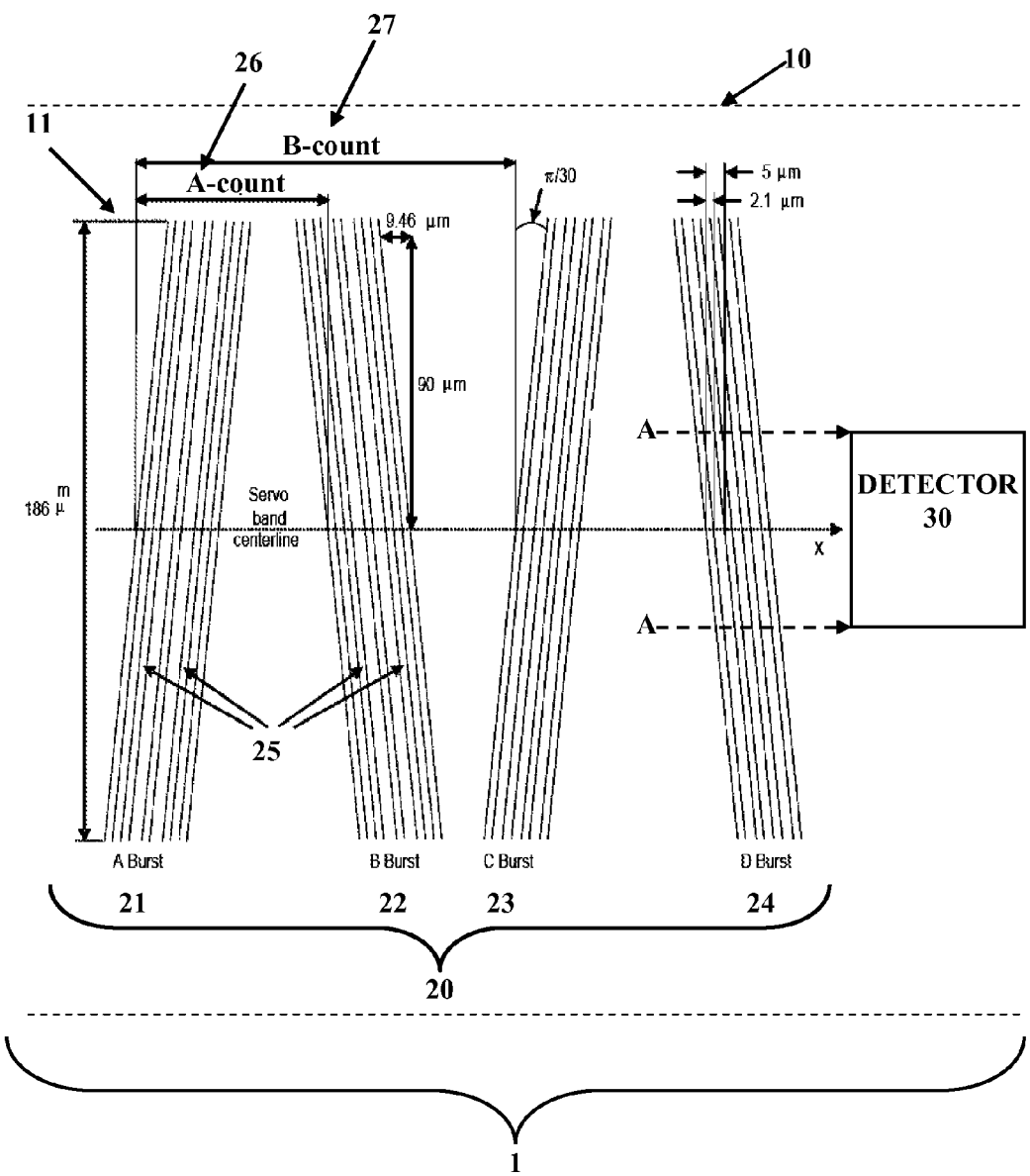
FIG. 1 is a schematic view of a storage medium.

With reference to FIG. 1, a storage medium 10, such as a linear tape, is provided for possible use in a system 1, which is not drawn to scale. Written to the storage medium 10 are servo patterns, of which only servo pattern 11 is shown, which straddle data bands (not shown). The servo patterns 11 are encoded to provide lateral and longitudinal position (LPOS) information to, e.g., a reading and/or writing unit that operates with respect to the storage medium 10. Each of the servo patterns 11 includes a servo frame 20 and each servo frame 20 includes an A burst 21, a B burst 22, a C burst 23 and a D burst 24. Each of the bursts 21-24 include a set of pulses 25 and may be independently modulated with multi-level PPM to encode at least one independent bit per burst.

With each of the bursts 21-24 independently modulated to encode at least one independent bit per burst, it is possible that up to four bits per servo frame can be encoded with binary PPM. Of course, additional bits can be encoded with other PPM methods, as will be discussed below. Also, symmetry of the modulated pulses 25 is preserved either within a burst 21-24 itself or within the servo frame 20 to allow averaging of A- and B-count measurements 26 and 27.

In accordance with embodiments of the invention, each of the bursts may be independently modulated with multi-level PPM with N shifts to encode log 2(N) bits. In exemplary cases, this means that at least one of the bursts 21-24 may be independently modulated with 2 shifts to encode 1 bit, at least one of the bursts 21-24 may be independently modulated with 4 shifts to encode 2 bits, at least one of the bursts 21-24 may be independently modulated with 5 shifts to encode 2.32 bits, at least one of the bursts 21-24 may be independently modulated with 6 shifts to encode 2.58 bits or at least one of the bursts 21-24 may be independently modulated with 8 shifts to encode 3 bits. With this said, it will be understood that still other numbers of shifts (e.g., odd numbers of shifts) and varying shift levels may be employed to encode higher numbers of bits.

In a general sense, each of the bursts 21-24 may be independently modulated with multi-level PPM with N shifts to encode log 2(N) bits, where N is an even or an odd number. Where N is an even number, the multi-level PPM includes shifts to the left and the right on the storage medium 10. Conversely, where N is an odd number, the multi-level PPM includes shifts to the left and the right on the storage medium 10 as well as a zero shift.

With the introduction of N-ary PPM using multiple shift levels, more than one bit per servo burst 21-24 may be encoded. An appropriate detector 30, such as a matched filter detector that responds to a signal obtained by a servo reader, moving in a direction identified by arrows A, which is substantially parallel with the servo band centerline, detects the encoded bits by finding a level that matches most closely a received servo waveform. Each level is associated with 1 or more encoded bits depending on the number of levels present.

Binary PPM generally has two possible levels $\pm\Delta s1$, which correspond to shifts towards the left or the right of a pulse with respect to a reference position. A ternary PPM is achieved by using the reference position or zero-shift mode as a third possible shift position. A quaternary PPM has two possible shifts $\pm\Delta s1$ and $\pm\Delta s2$ in each direction.

Thus, an N-ary, N even, PPM has N possible shifts $\pm\Delta s1$, $\pm\Delta s2, \ldots, \pm\Delta sN/2$ in each direction along the storage medium 10. If the zero-shift position is also allowed as a valid level, this results in an N-ary, N odd, PPM where the zero-shift level is allowed in addition to N shifts $\pm\Delta s1, \pm\Delta s2, \ldots, \pm\Delta s(N-1)/2$ in each direction. As such, the number of bits that can be encoded is log 2(N) bits (such that N=2: 1 bit; N=4: 2 bits, N=5: 2.58 bits, etc.).

The additionally encoded bits may provide additionally embedded information that can be utilized in multiple ways. For example, the independent modulation with multi-level PPM may encode an LPOS bit or, in alternate embodiments, one or more LPOS bits over one or more of the bursts 21-24. The independent modulation with multi-level PPM may further encode additional information over the one or more of the bursts. In still further embodiments, the independent modulation with multi-level PPM may encode phase information and/or servo band information over one or more of the bursts 21-24. Here, the servo band information may include a servo band number or some other similar item of data. Of course, it is possible that each of the above-noted items may be encoded separately or jointly with some or all of the other items.

In accordance with aspects of the invention, N-ary or multi-level PPM provides for the encoding of one or more bits of information in one servo burst without a need to change the servo frame structure. As long as the symmetry of the modulated pulses 25 is kept within a servo frame, all properties of the original servo frame, including the possibility of averaging A- and B-count measurements, are preserved.

The symmetry can either be kept within a servo burst 21-24 itself or within the servo frame 20. For servo burst 21-24 symmetry, a shift of a first pulse 25 in a servo burst in one direction is followed by a shift of a second pulse 25 in the same servo burst in the opposite direction with the same shift distance. Alternately, an exemplary shift of the second or the fourth pulses may take place in the same direction in all modulated bursts, such that the shifts can be averaged out in an A- or B-count measurement.

Figure 2:
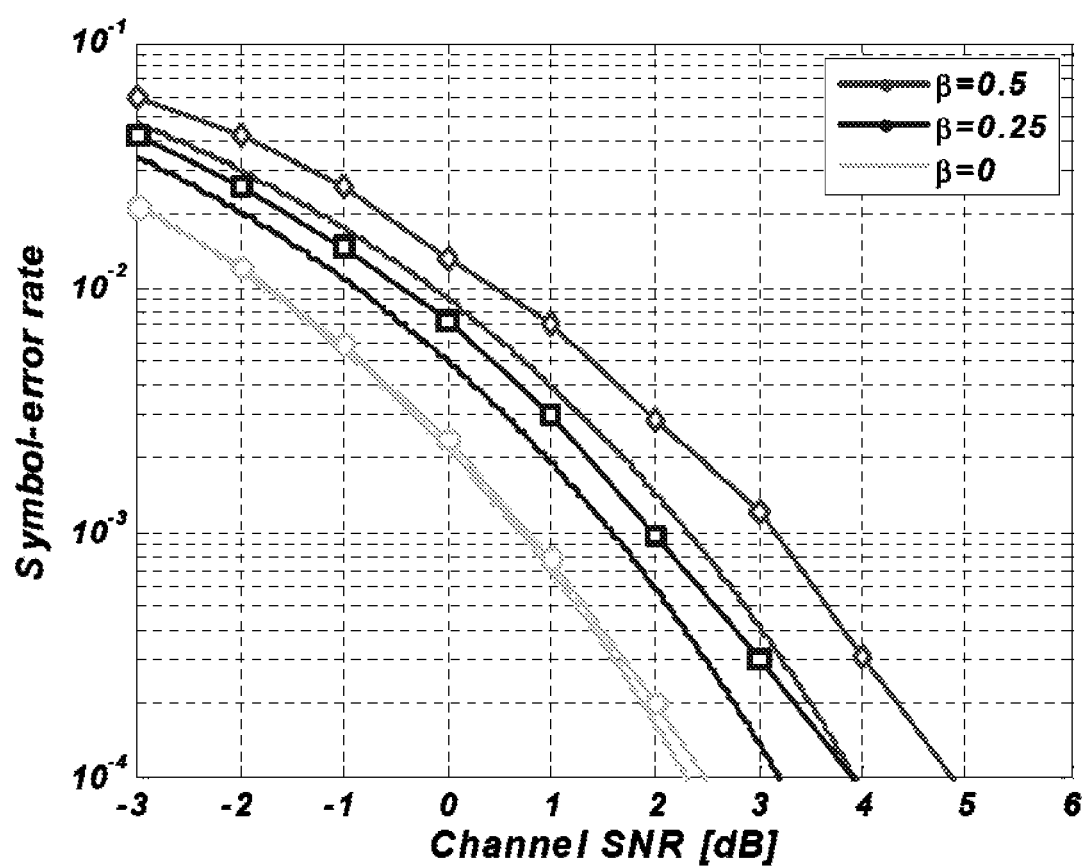
FIG. 2 is a plot of LPOS symbol-error rate vs. channel SNR.

A requirement for multi-level PPM given a limited amount of maximum shift, or modulation depth, which is determined by the distance between consecutive pulses within a servo burst, is a relatively high signal-to-noise ratio (SNR) to guarantee the reliable discrimination of the different levels by an appropriate detection scheme. FIG. 2 shows the LPOS symbol error rate for binary PPM for different ratios, $\beta$, of the medium noise power relative to the total noise power in the servo signal. It can be seen that, in all cases, the symbol error rate drops below a LPOS symbol error rate of $10^{-4}$ for channel SNR values of 5 dB or less when using, e.g., a matched-filter detector.

In FIG. 2, the curves with markers indicate the performance of a detection system implemented in hardware, which exhibits very close performance to an ideal system, as shown by the lines without markers. As shown, a required channel SNR of about 5 dB is relatively much lower than a typically observed SNR of about 20 dB for a typical servo channel operating point. Therefore, sufficient SNR margin is available to support multi-level PPM.

Figure 3:
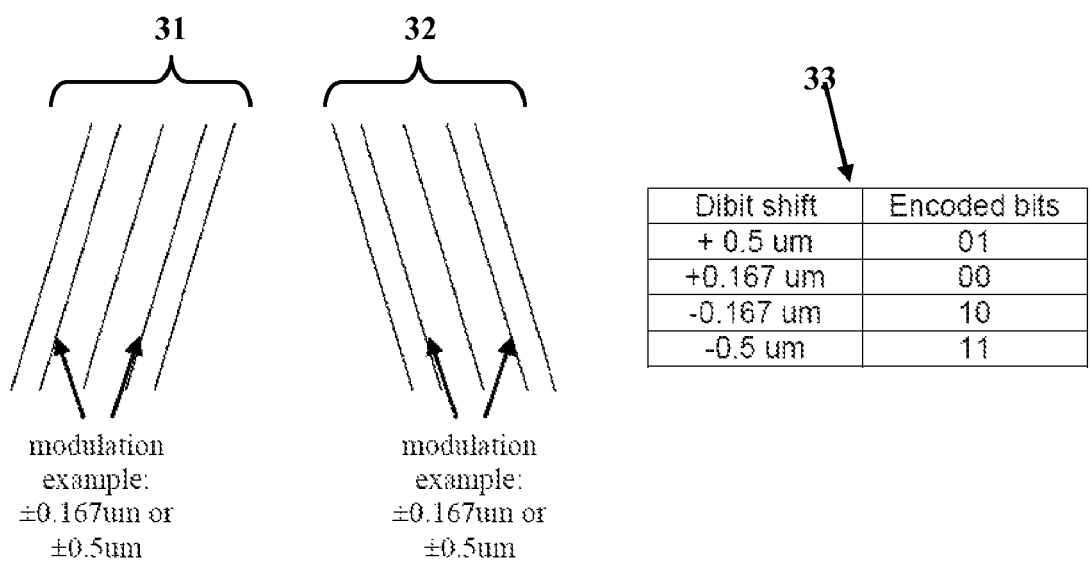
FIG. 3 illustrates exemplary servo bursts.

With reference to FIG. 3, with a quaternary PPM, 2 bits can be encoded in one burst 31 or 32. For instance, in an LTO pattern, a modulation depth of $\pm\Delta s1=0.167$ µm and $\pm\Delta s2=0.5$ µm could be defined, if the zero-shift position is not used as a valid modulation level and the maximum shift is ±0.5 µm. Here, one bit can be used for LPOS encoding and one bit can be used for the encoding of other information.

The table 33 in FIG. 3 captures the shift of the second pulse of the considered servo bursts. The fourth pulse is shifted in the opposite direction to maintain symmetry. In the example above, the most significant bit might encode the LPOS bit. Therefore, any shift of the second pulse towards the left might encode an LPOS bit '1 '. The least significant bit can encode the additional information depending on the shift amount in either direction.

Figure 4:
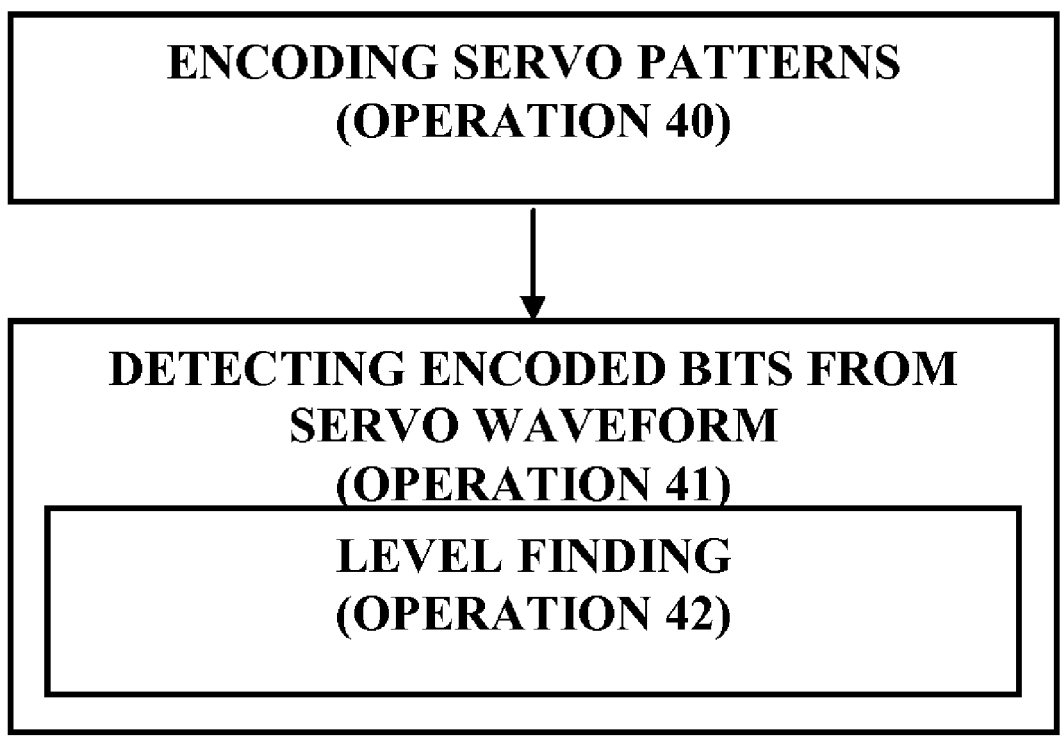
FIG. 4 is a flow diagram illustrating a method of manipulating information with respect to a storage medium according to embodiments of the invention.

With reference to FIG. 4 and in accordance with another aspect of the invention, a method of controlling information with respect to a storage medium is provided. The method includes encoding servo patterns on the storage medium to provide lateral and longitudinal position information, each of the servo patterns comprising a servo frame, including first through fourth bursts, which are each independently modulated to encode at least one independent bit per burst (operation 40). The method may further include reading a servo waveform from the servo patterns of the storage medium and detecting the encoded bits from the servo waveform (operation 41). The detecting may include finding a level that is a relatively close match to that of the servo waveform and is achieved based on data provided by a filter output signal (operation 42).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A storage medium on which servo patterns are encoded to provide lateral and longitudinal position (LPOS) information, each of the servo patterns comprising a servo frame, including first through fourth bursts, which are each independently modulated with multi-level pulse position modulation (PPM) to encode at least one independent bit per burst.

2. The storage medium according to claim 1, wherein the storage medium is a linear magnetic tape.

3. The storage medium according to claim 1, wherein each of the bursts are independently modulated with multi-level PPM with N shifts to encode log 2(N) bits.

4. The storage medium according to claim 3, wherein N is an even number and the multi-level PPM includes shifts to the left and the right on the storage medium.

5. The storage medium according to claim 3, wherein N is an odd number and the multi-level PPM includes shifts to the left and the right on the storage medium and a zero shift.

6. The storage medium according to claim 3, wherein the shifts are shifts of at least one of about ±0.5 μm and about ±0.167 μm.

7. The storage medium according to claim 1, wherein the independent modulation with multi-level PPM encodes an LPOS bit over one or more of the bursts.

8. The storage medium according to claim 7, wherein the independent modulation with multi-level PPM further encodes additional information over the one or more of the bursts.

9. The storage medium according to claim 1, wherein the independent modulation with multi-level PPM encodes one or more LPOS bits over one or more of the bursts.

10. The storage medium according to claim 9, wherein the independent modulation with multi-level PPM further encodes additional information over the one or more of the bursts.

11. The storage medium according to claim 1, wherein the independent modulation with multi-level PPM encodes phase information over one or more of the bursts.

12. The storage medium according to claim 1, wherein the independent modulation with multi-level PPM encodes servo band information over one or more of the bursts.

13. The storage medium according to claim 12, wherein the servo band information includes a servo band number.

14. A method of controlling information with respect to a storage medium, the method comprising:
    encoding servo patterns on the storage medium to provide lateral and longitudinal position information, each of the servo patterns comprising a servo frame, including first through fourth bursts, which are each independently modulated with multi-level pulse position modulation (PPM) to encode at least one independent bit per burst.

15. The method according to claim 14, further comprising reading a servo waveform from the servo patterns of the storage medium and detecting the encoded bits from the servo waveform.

16. The method according to claim 15, wherein the detecting comprises finding a level that is the closest match to that of the servo waveform.

17. The method according to claim 15, wherein the detecting is achieved based on data provided by a servo reader.

18. A system, comprising:
    a storage medium on which servo patterns are encoded to provide lateral and longitudinal position information, each of the servo patterns comprising a servo frame, including first through fourth bursts, which are each independently modulated with multi-level pulse position modulation (PPM) to encode at least one independent bit per burst; and
    a detector to read a servo waveform from the servo patterns of the storage medium and to detect the encoded bits from the servo waveform.

19. The system according to claim 18, wherein the detector comprises a matched-filter detector.

20. The system according to claim 18, wherein the detector detects the encoded bits based on data provided by a filter output signal.

* * * * *